United States Patent
Wang

(10) Patent No.: US 7,548,858 B2
(45) Date of Patent: Jun. 16, 2009

(54) SYSTEM AND METHOD FOR SELECTIVE AUDIBLE RENDERING OF DATA TO A USER BASED ON USER INPUT

(75) Inventor: Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 10/382,121

(22) Filed: Mar. 5, 2003

(65) Prior Publication Data

US 2004/0176954 A1 Sep. 9, 2004

(51) Int. Cl.
*G10L 13/00* (2006.01)
*G10L 15/22* (2006.01)
*G06F 17/30* (2006.01)

(52) U.S. Cl. .............. 704/260; 704/275; 707/3
(58) Field of Classification Search ............ 704/9, 704/10; 707/5, 4
See application file for complete search history.

(56) References Cited

U.S. PATENT DOCUMENTS

| | | | |
|---|---|---|---|
| 5,020,107 A | 5/1991 | Rohani et al. | |
| 5,666,438 A | 9/1997 | Beernink | |
| 5,715,445 A | 2/1998 | Wolfe | 395/605 |
| 5,715,450 A | 2/1998 | Ambrose et al. | |
| 5,748,841 A | 5/1998 | Morin et al. | |
| 5,864,863 A | 1/1999 | Burrows | |
| 5,978,799 A * | 11/1999 | Hirsch | 707/4 |
| 6,018,710 A * | 1/2000 | Wynblatt et al. | 704/260 |
| 6,108,629 A * | 8/2000 | Kasday | 704/258 |
| 6,292,833 B1 | 9/2001 | Liao | |
| 6,366,651 B1 * | 4/2002 | Griffith et al. | 379/88.14 |
| 6,424,968 B1 | 7/2002 | Broster et al. | |
| 6,463,480 B2 * | 10/2002 | Kikuchi et al. | 719/315 |
| 6,483,899 B2 * | 11/2002 | Agraharam et al. | 379/88.14 |

(Continued)

FOREIGN PATENT DOCUMENTS

EP 0645757 A1 3/1995

(Continued)

OTHER PUBLICATIONS

Kuansan Wang, "Implementation of a multimodal dialog system using extended markup languages", Proc. ICSLP, Oct. 2000.*

(Continued)

*Primary Examiner*—Talivaldis Ivars Smits
(74) *Attorney, Agent, or Firm*—Westman, Champlin & Kelly, P.A.

(57) ABSTRACT

A method of rendering information is provided and includes rendering data to a user, identifying a first object and a second object in a query, and accessing the document to identify semantic tags associated with text in the document. The first object and second object are associated with a first semantic tag corresponding to a first portion of stored text and a second semantic tag corresponding to a second portion of stored text. At least one of the first portion and second portion of stored text is associated with the data that was rendered. A third portion of stored text that is associated with both the first portion and the second portion is identified and selectively audibly rendered. In one example, a data output is generated as a function of values relative to first and second portions of stored information based on a data operation associated with a command object.

31 Claims, 20 Drawing Sheets

U.S. PATENT DOCUMENTS

| | | | |
|---|---|---|---|
| 6,519,562 | B1 | 2/2003 | Phillips |
| 6,604,103 | B1* | 8/2003 | Wolfe .............................. 707/5 |
| 6,615,172 | B1 | 9/2003 | Bennett et al. |
| 6,850,934 | B2* | 2/2005 | Bates et al. .................... 707/5 |
| 6,876,969 | B2* | 4/2005 | Nakao ........................ 704/260 |
| 6,934,687 | B1* | 8/2005 | Papierniak et al. ............ 705/10 |
| 6,999,932 | B1* | 2/2006 | Zhou ........................... 704/277 |
| 7,010,518 | B1* | 3/2006 | Bedell et al. .................... 707/3 |
| 7,197,462 | B2* | 3/2007 | Takagi et al. ................ 704/275 |
| 2002/0026314 | A1 | 2/2002 | Nakao ........................ 704/258 |
| 2002/0165707 | A1* | 11/2002 | Call ............................... 704/2 |

FOREIGN PATENT DOCUMENTS

| | | |
|---|---|---|
| EP | 0817002 A2 | 1/1998 |
| EP | 0817002 A2 | 7/1998 |
| EP | 0903728 A2 | 3/1999 |
| EP | 1255193 A2 | 6/2002 |
| JP | 03-0167666 | 7/1991 |
| JP | 2846374 | 1/1999 |
| WO | WO 99/23581 | 6/1999 |
| WO | WO 99/45531 | 9/1999 |
| WO | WO 00/72196 | 1/2001 |
| WO | WO 01/61568 | 9/2001 |
| WO | WO 01/93249 A1 | 12/2001 |
| WO | WO02/31814 | 4/2002 |
| WO | WO 02/33583 | 5/2002 |
| WO | WO 02/46964 | 6/2002 |

OTHER PUBLICATIONS

Kuansan Wang, "Natural language enabled web applications," Proc. 1$^{st}$ NLP and XML Workshop, Nov. 2001.*

Kuansan Wang, "SALT: A spoken language interface for web-based multimodal dialog systems," Proc. ICSLP, Sep. 2002.*

European Search Report, 3 pages, Mar. 22, 2006.

Austrian Search Report, 8 pages, Jun. 19, 2006.

An Official Search Report of the Russian Federation in counterpart foreign application No. 2004106570 filed Mar. 4, 2004.

Office Action from Israel Patent Office for Patent Application No. 160462, filed Feb. 19, 2004.

Second Office Action from China Patent Office for Patent Application No. 200410028602.4, filed Mar. 5, 2004.

Official Action from Russian patent application 2004106570, filed Mar. 4, 2004.

Office Action from Vietnamese patent application No. 1-2004-00195, dated Oct. 23, 2008.

Examination Report, Ministry of Economic Development, Feb. 25, 2004.

Salt Speech Application Language Tags (SALT) 1.0 Specification, Jul. 15, 2002, Cisco Systems, Inc., Comverse Inc., Intel Corporation, Microsoft Corporation, Philips Electronics N.V., SpeechWorks International Inc., 2002.

W3C Voice Extensible Markup Language (VoiceXML) Version 2.0, pp. 1-235, http://www.w3.org/tr/voicexml20/ , Jul. 15, 2002.

Official Notice of Rejection for Japanese patent application 2004-063224, mailed Aug. 22, 2008.

* cited by examiner

```
<html xmlns:salt="http://www.saltforum.org/2002/07">
<head>
<title>Simply SALT Demo</title>
<object id="MS-SALT" CLASSID="clsid:33cbfc53-a7de-491a-90f3-0e782a7e347a">
</object>
</head>
<?import namespace="salt" implementation="#MS-SALT">
<body onload="welcome.Start()">
  <xml id="database">
    <table>
        <company>
          <name>ABC</name>
          <q1>31.21</q1><q2>35.38</q2><q3>30.44</q3><q4>31.55</q4>
        </company>
        <company>
          <name>CBA</name>
          <q1>22.24</q1><q2>20.03</q2><q3>24.55</q3><q4>27.64</q4>
        </company>
        <company>  ← 676
          <name>MSFT</name>   ← 677
          <q1>47.42</q1><q2>54.12</q2><q3>50.11</q3><q4>55.22</q4>
        </company>            678
        <company>
          <name>ZXY</name>
          <q1>15.46</q1><q2>13.22</q2><q3>17.88</q3><q4>25.99</q4>
        </company>
        <company>
          <name>XYZ</name>
          <q1>14.29</q1><q2>12.03</q2><q3>11.11</q3><q4>15.01</q4>
        </company>
    </table>
  </xml>

<input id="querySubject">
  <input id="queryObject">
  <input id="queryResult">
```

670 — (html/head block)
672 — (xml database block)
674 — (input block)

FIG. 10A

```
<salt:listen id="command"    ◄—— 680
  onReco="doQuery()"
  onError="alert('Error code='+ event.srcElement.status)">
    <salt:grammar id="mainGrammar">   ◄—— 682
        <grammar langid="409">
            <rule name="start" toplevel="active">
                <phrase>what is ?the <ruleref name="object"/> result of <ruleref name="subject"/></phrase>
            </rule>
            <rule name="subject">
                <list propname="subject">
                    <phrase valstr="ABC">A. B. C.</phrase>
                    <phrase valstr="CBA">C. B. A.</phrase>
                    <phrase valstr="MSFT">?the Microsoft ?Corporation</phrase>              688
                    <phrase valstr="MSFT">M. S. F. T.</phrase>
                    <phrase valstr="ZXY">Z. X. Y.</phrase>
                    <phrase valstr="XYZ">X. Y. Z.</phrase>
                </list>
            </rule>
            <rule name="object">
                <list propname="object">
                    <phrase valstr="q1"> first quarter</phrase>
                    <phrase valstr="q1"> Q. one</phrase>
                    <phrase valstr="q2"> second quarter</phrase>
                    <phrase valstr="q2"> Q. two </phrase>                                    690
                    <phrase valstr="q3"> third quarter </phrase>
                    <phrase valstr="q3"> Q. three< /phrase>
                    <phrase valstr="q4"> fourth quarter </phrase>
                    <phrase valstr="q4"> Q. four </phrase>
                </list>
            </rule>
        </grammar>
    </salt:grammar>
</salt:listen>

<salt:prompt id="tts">The <salt:value targetElement="queryObject"/> of   ◄—— 684
    <salt:value targetElement="querySubject"/> is
    <salt:value targetElement="queryResult"/>
</salt:prompt>

<salt:prompt id="welcome" oncomplete="command.Start()">Please say your query.</salt:prompt>   ◄—— 686

</body>
```

FIG. 10B

```
<script>
        function doQuery() {
            var obj = command.recoresult.selectSingleNode("/sml/object");
            var sub = command.recoresult.selectSingleNode("/sml/subject");
                // compose query string to search for the data
            var queryString = "company/name='"+ sub.text + "' and company/"
+ obj.text;
            queryResult.value = database.selectSingleNode(queryString).text;
                // compose answer string with user's own wording
            queryObject.value = obj.attributes.selectSingleNode("text").value;
            querySubject.value =
sub.attributes.selectSingleNode("text").value;
                // activate TTS
            tts.Start();
        }
</script>
</html>
```

DRIVING DIRECTIONS
FROM 6141 CONCORD AVE TO 221 LANGDON ST

| DIRECTION | STREET NAME | DISTANCE | SIGN POST |
|---|---|---|---|
| LEFT | CONCORD AVE | 0.5 | STOP SIGN |
| RIGHT | BROOKVIEW AVE | 14.5 | STOP LIGHT |
| MERGE LEFT | INTERSTATE 38 | 11.1 | EXIT 7 |
| EXIT | EAST 4TH STREET | 10.0 | 3-WAY INTERSECTION |
| BEAR RIGHT | LANGDON STREET | 1.8 | |

TOTAL DISTANCE: 38.4 MILES
APPROXIMATE TRAVEL TIME: 44 MINUTES ← 706

710 → <NEXT>
<PREVIOUS>
<FIRST>
<LAST>

708 → <DIRECTION>
<STREET NAME>
<DISTANCE>
<SIGN POST>
<TOTAL>
<ROW>
<COLUMN>

FIG. 11

800 → The Dow Jones Industrial Average tumbled two hundred thirty eight point four two, or two point eight five percent, to eight thousand one hundred thirty one point zero one, while the Standard and Poor's five hundred stock index lost twenty five point nine four, or two point nine percent. to eight hundred sixty one point four zero. Meanwhile, the Nasdaq Composite Index slumped about fourty six point one four, or three point three percent, to one thousand three hundred fourty two point one three. The selling was broad based. All thirty stocks that make up the industrial average closed lower, with J. P. Morgan, Honeywell, Intel, Microsoft, American Express, and Alcoa leading the blue chips with losses near or above four point five percent. The index again fell below last year's closing point of eight thousand three hundred fourty one point six three, dropping to levels last seen in late October.

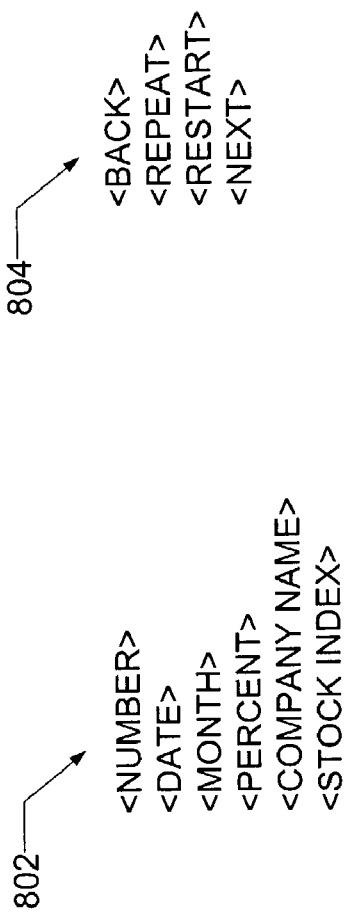

FIG. 13

```
<html xmlns:salt="http://www.saltforum.org/2002/07">
<head>
<title>News Reader Demo</title>
<object id="MS-SALT" CLASSID="clsid:33cbfc53-a7de-491a-90f3-0e782a7e347a">
</object>
</head>
<?import namespace="salt" implementation="#MS-SALT">
<body onload="init()">
```
} 810

```
<!-- The following XML is the outcome of passing WSJ article through a text analyzer that tags name
              entities and normalizes text for prosody assignments.
-->
<xml id="news">
 <metadata>
  <sentence>The <entity name="stock index">Dow Jones Industrial Average </entity>tumbled
<entity name="number">two hundred thirty eight point four two, </entity>or <entity
name="percent">two point eight five percent, </entity>to <entity name="number">eight
thousand one hundred thirty one point zero one, </entity>while the <entity name="stock
index">Standard and Poor's five hundred stock index </entity>lost <entity
name="number">twenty five point nine four, </entity>or <entity name="percent">two point nine
percent. </entity>to <entity name="number">eight hundred sixty one point four zero. </
entity></sentence>
  <sentence>Meanwhile, the <entity name="stock index">Nasdaq Composite Index </
entity>slumped about <entity name="number">forty six point one four, </entity>or <entity
name="percent">three point three percent, </entity>to <entity name="number">one thousand
three hundred fourty two point one three</entity>. </sentence>
  <sentence>The selling was broad based. </sentence>
  <sentence>All <entity name="number">thirty </entity>stocks that make up the industrial
average closed lower, with <entity name="company name">J. P. Morgan, </entity><entity
name="company name">Hoenywell, </entity><entity name="company name">Intel, </
entity><entity name="company name">Microsoft, </entity><entity name="company
name">American Express, </entity>and <entity name="company name">Alcoa </
entity>leading the blue chips with losses near or above <entity name="percent">four point five
percent. </entity></sentence>
  <sentence>The index again fell below last year's closing point of <entity
name="number">eight thousand three hundred fourty one point six three, </entity>dropping to
levels last seen in late <entity name="month">October. </entity></sentence>
 </metadata>
</xml>

<div id="debug"></div> <!-- display the text being played here -->
```
} 812

FIG. 14A

```
<salt:listen id="reco"   ←——— 814
    onReco="execute_cmd()" onNoReco="reprompt.Start()" onsilence="move_next()">
    <salt:grammar id="name">    ←——— 816
        <grammar langid="409">
            <rule name="cmds" toplevel="active">
                <l>
                    <ruleref name="navigate"/>
                    <ruleref name="query"/>
                </l>
            </rule>
            <rule name="navigate">
                <l propname="navigate">
                    <p valstr="back">go back <o>one sentence</o></p>
                    <p valstr="repeat"><l> <p>replay</p><p>repeat</p></l> <o>?the sentence</o> </p>    822
                    <p valstr="restart"><l><p>restart</p><p>repeat from ?the beginning</p></l></p>
                    <p valstr="next"><l><p>next ?sentence</p><p>continue</p></l></p>
                </l>
            </rule>
            <rule name="query">
                <p>
                    <l><p>repeat</p><p>say ?the</p></l>
                    <l propname="query">
                        <p valstr="number"> ?the number </p>
                        <p valstr="date"> ?the date </p>
                        <p valstr="month"> ?the month </p>    824
                        <p valstr="percent"> ?the percentage </p>
                        <p valstr="company name"> ?the company names </p>
                        <p valstr="stock index"> ?the stock index </p>
                    </l>
                    <o>again</o>
                </p>
            </rule>
        </grammar>
    </salt:grammar>
</salt:listen>

<salt:prompt id="reprompt" onComplete="reco.Start()">   ←——— 818
Sorry, I missed that. Please say the command again.
</salt:prompt>

<salt:prompt id="tts" onComplete="reco.Start()"></salt:prompt>   ←——— 820
```

FIG. 14B

```
</body>

<script>
    var curSent, curPrompt;
    function execute_cmd() {
    // the event handler for recognizing navigation or query commands
      var node = reco.recoresult.firstChild;
      if (node.nodeName == "query") {
            extract_item(node.text);
      } else if (node.nodeName == "navigate") {
            if (node.text == "back")
                  move_back();
            else if (node.text == "repeat")
                  display();
            else if (node.text == "restart")
                  init();
            else move_next();
      } else
            move_next();
    }
    function init() { // event handler to play the text from the very beginning
            curSent = news.XMLDocument.selectSingleNode("metadata/sentence");
            curPrompt = curSent.text;
            display();
    }
    function move_back() { // move back one sentence
            if (curSent.previousSibling != null) {
                    curSent = curSent.previousSibling;
                    curPrompt = curSent.text;
            }
            display();
    }
    function move_next() { // move on to the next sentence
            if (curSent.nextSibling != null) {
                    curSent = curSent.nextSibling;
                    curPrompt = curSent.text;
            }
            display();
    }
```

- 828 : execute_cmd block
- 830 : init block
- 832 : move_back block
- 834 : move_next block

FIG. 14C

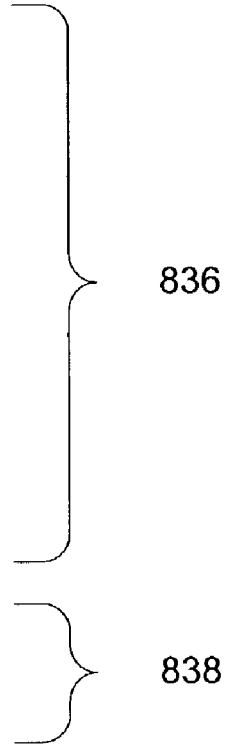

```
function extract_item(target) { // processing query items
        var str = "./entity[@name='";
        str += target;
        str += "']";
        var candidates = curSent.selectNodes(str);
        str = "For " + target + " I mentioned ";
        var count = candidates.length;
        if (count == 0)
                str += "nothing.";
        else {
          for (var i = 0; i < count; ++i)
                str += candidates.item(i).text + " ";
        }
        curPrompt = str;
        display();
}
function display() {
        debug.innerText = curPrompt;
        tts.Start(curPrompt);
}
</script>
```

FIG. 14D

"Hi Mel, it's Todd. I was calling regarding our trip. Give me a call at 612-333-8888."

840

842

<person>
<subject>
<phone number>

FIG. 15

SYSTEM AND METHOD FOR SELECTIVE AUDIBLE RENDERING OF DATA TO A USER BASED ON USER INPUT

BACKGROUND OF THE INVENTION

The present invention relates to access and rendering of information in a computer system. More particularly, the present invention relates to presentation of data based on voice input from a user.

Many computer interfaces are based on computer driven interactions in which the user must follow an execution flow set by the computer or learn one or more commands exposed by the computer. In other words, most computer interfaces do not adapt to the manner in which the user wishes to interact with the computer, but instead force the user to interact through a specific set of interfaces.

Advances in computer/user interfaces have allowed users to interact with a computer through voice commands. Voice portals such as through the use of Voice XML (voice extensible mark-up language) have been advanced to allow internet content to be accessed using voice input. In this architecture, a document server (for example, a web server) processes requests from a client through a Voice XML interpreter. The web server can produce Voice XML documents and replies, which are processed by the Voice XML interpreter and rendered audibly to the user. Using specified voice commands through voice recognition, the user can navigate the web and listen to data audibly rendered.

However, many applications that present data to a user, for example driving directions, traffic reports, weather reports and movie schedules, are not particularly user friendly. In particular, the applications have difficulty rendering portions of information that have previously been rendered or portions of structured information stored in a table. For example, various services offer driving directions, but do so in one extended reading to the user, or in predetermined steps. As a result, users may need to write down all of driving directions, or continue to replay the complete driving directions, or the predetermined steps, in an attempt to memorize the relevant information. Both of these situations are undesirable in many circumstances.

Accordingly, there is a need to access and render portions of data with more flexibility. Such a system or method of rendering would be easier to use by being more natural to the user.

SUMMARY OF THE INVENTION

The present invention provides an improved interface for rendering data to a user based on voice input. In one aspect of the present invention, a method of rendering information to a user includes identifying a first object and a second object from an utterance of speech. The first object and the second object are associated with tags that correspond to stored information. The stored information is selectively rendered based on the first object and the second object. In one embodiment, objects identified can be query objects, navigation objects, and/or command objects for selectively rendering the information. In one particular aspect, stored information is arranged in a table having a plurality of rows and a plurality of columns. A first object includes information pertaining to a particular row and a second object includes information pertaining to a particular column.

In another aspect of the present invention, a method is provided that includes rendering a segment of information to a user. The segment includes tags that correspond to portions of the segment. The method further includes identifying at least one object from an utterance of speech and associating the object with the tag corresponding to portions of the segment. The portion of the segment corresponding to the tag is then rendered. In a further embodiment, in order to render portions of the segment, a text normalizer/analyzer can be used to identify relevant portions within the segment.

As a result, the present invention provides a suitable way to present multi-dimensional data and render portions of stored information in a database. Users are presented with a more natural interface for presenting data based on voice input. For example, a user may query individual cells in a table or create a two-way dialog based on stored information.

BRIEF DESCRIPTION OF THE DRAWINGS

FIGS. 10A-10C contain exemplary code used for rendering the table in FIG. 9.

FIG. 11 is a diagram of a table of driving directions and objects for rendering data within the table.

FIG. 13 is a paragraph of text and objects for rendering data within the paragraph of text.

FIGS. 14A-14D contain exemplary code used for rendering data within the paragraph of FIG. 13.

FIG. 15 is a voicemail message and objects used for rendering data in the voicemail message.

DETAILED DESCRIPTION OF ILLUSTRATIVE EMBODIMENTS

Figure 1:
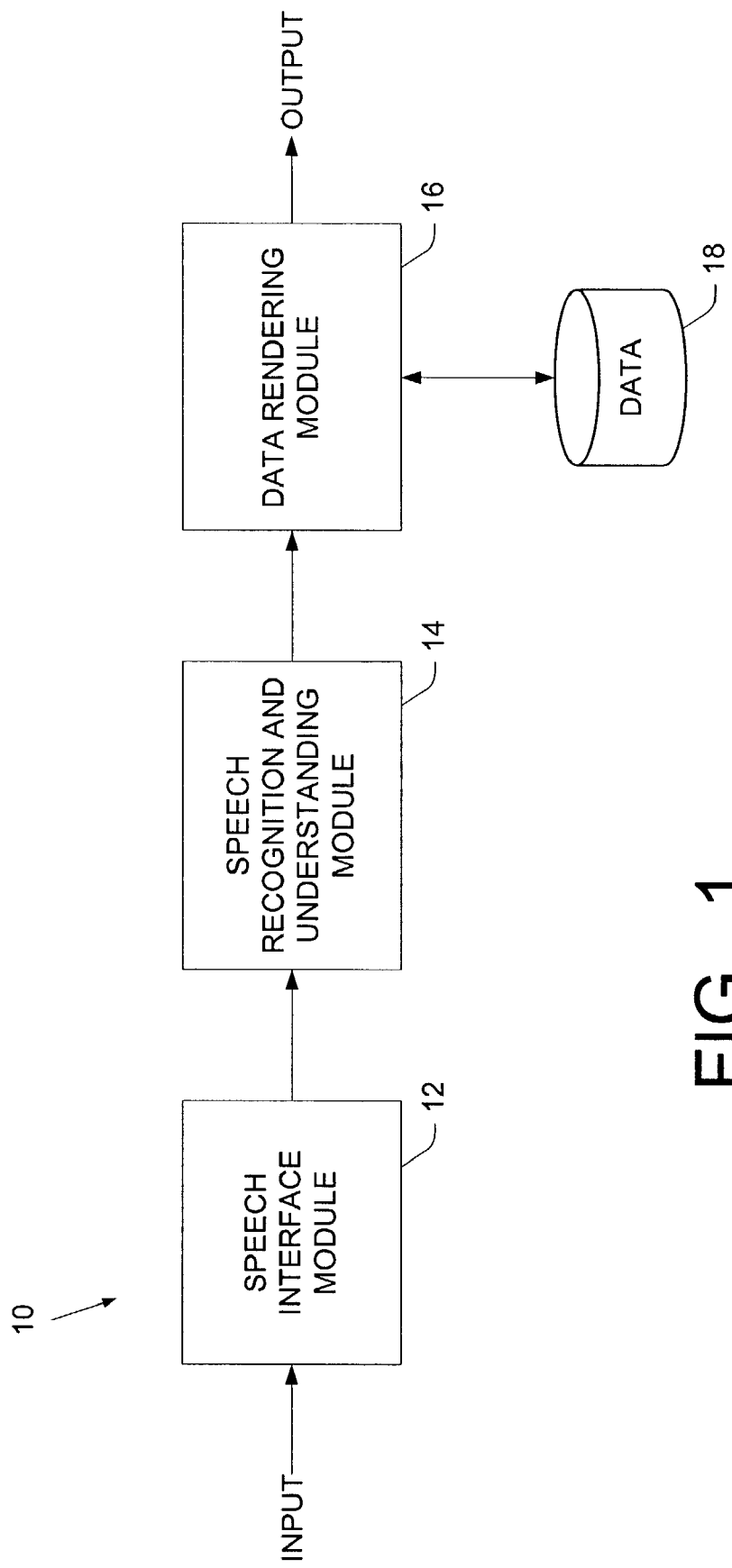
FIG. 1 is a block diagram of a data presentation system.

FIG. 1 is a block diagram of a data presentation system 10 for rendering data based on voice input. System 10 includes a speech interface module 12, a speech recognition and understanding module 14 and a data rendering module 16. A user provides input in the form of a voice query to speech interface module 12. Speech interface module 12 gathers speech information from a user and provides a signal indicative thereof. After the input speech has been gathered by speech interface module 12, speech recognition and understanding module 14 recognizes the speech using a speech recognizer and identifies objects such as key words or key phrases that pertain to information the user wishes the system 10 to render. The objects are used by data rendering module 16 in order to extract data from a database 18. Once the relevant information has been identified in database 18 using the objects, relevant information can be rendered to the user. The output of data rendering module 16 may be in different forms, including an audio and/or visual output.

Given the broad description for rendering data based on a voice query, it may be useful to describe generally computing devices that can function in system 10 described above. As appreciated by those skilled in the art, the components of system 10 may be located within a single computer or distributed across a distributed computing environment using network connections and protocols.

Figure 2:
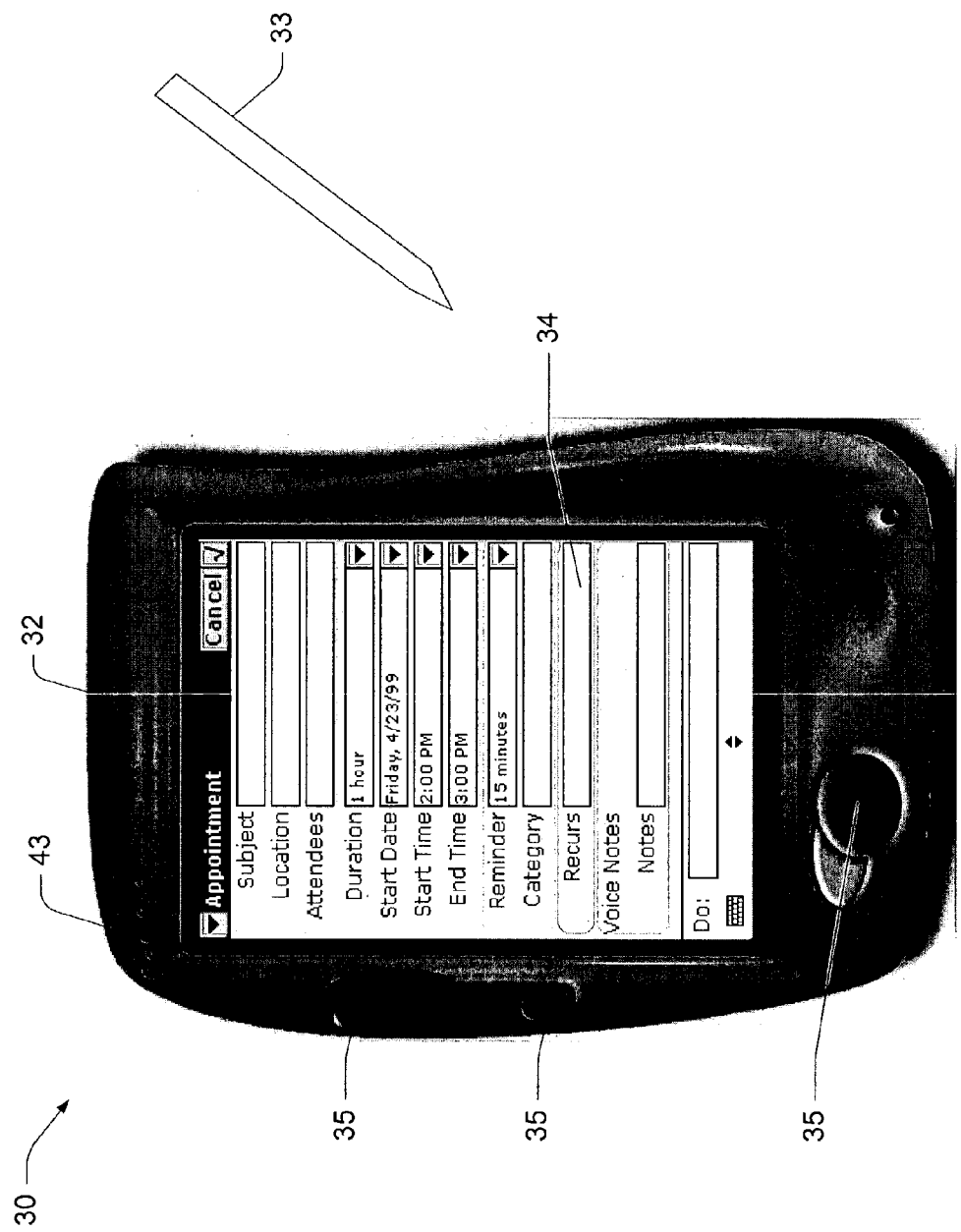
FIG. 2 is a plan view of a computing device operating environment.

Referring now to FIG. 2, an exemplary form of a mobile device such as a data management device (PIM, PDA or the like) is illustrated at 30. However, it is contemplated that the present invention can also be practiced using other computing devices discussed below. For example, phones and/or data management devices will also benefit from the present invention. Such devices will have an enhanced utility compared to existing portable personal information management devices and other portable electronic devices.

An exemplary form of a data management mobile device 30 is illustrated in FIG. 2. The mobile device 30 includes a housing 32 and has an user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the invention is not intended to be limited by these forms of input mechanisms. For instance, another form of input can include a visual input such as through computer vision.

Figure 3:
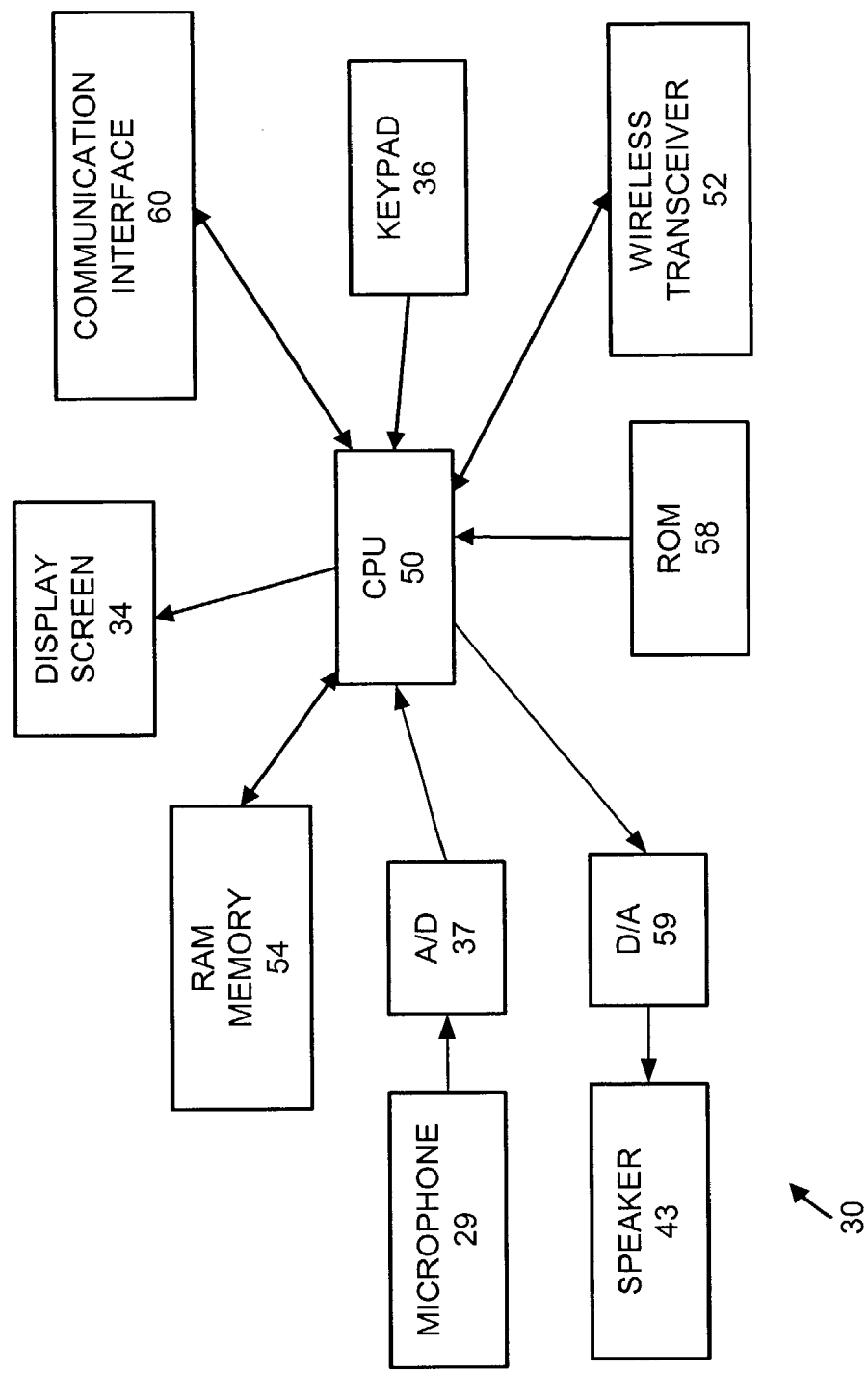
FIG. 3 is a block diagram of the computing device of FIG. 2.

Referring now to FIG. 3, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile device 30 and other operating system kernel functions (e.g., the loading of software components into RAM 54).

RAM 54 also serves as a storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results. Using wireless transceiver 52 or communication interface 60, speech data can be transmitted to a remote recognition server 204 discussed below and illustrated in the architecture of FIG. 6. Recognition results are then returned to mobile device 30 for rendering (e.g. visual and/or audible) thereon, and eventual transmission to a web server 202 (FIG. 6), wherein the web server 202 and mobile device 30 operate in a client/server relationship. Similar processing can be used for other forms of input. For example, handwriting input can be digitized with or without pre-processing on device 30. Like the speech data, this form of input can be transmitted to the recognition server 204 for recognition wherein the recognition results are returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input.

Figure 4:
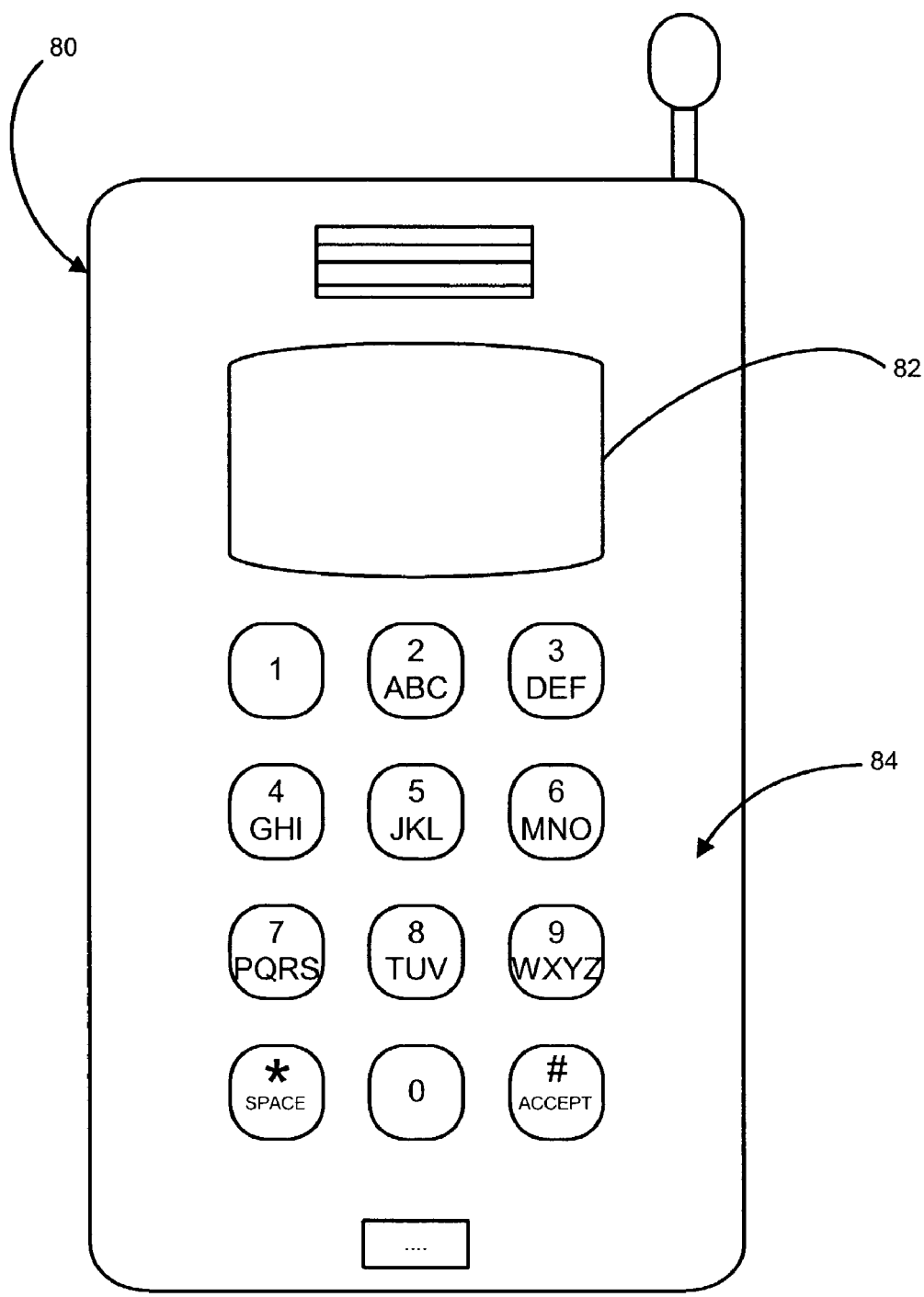
FIG. 4 is a plan view of a telephone.

FIG. 4 is a plan view of an exemplary embodiment of a portable phone 80. The phone 80 includes a display 82 and a keypad 84. Generally, the block diagram of FIG. 3 applies to the phone of FIG. 4, although additional circuitry necessary to perform other functions may be required. For instance, a transceiver necessary to operate as a phone will be required for the embodiment of FIG. 3; however, such circuitry is not pertinent to the present invention.

In addition to the portable or mobile computing devices described above, it should also be understood that the present invention can be used with numerous other computing devices such as a general desktop computer. For instance, the present invention will allow a user with limited physical abilities to input or enter text into a computer or other computing device when other conventional input devices, such as a full alpha-numeric keyboard, are too difficult to operate.

The invention is also operational with numerous other general purpose or special purpose computing systems, environments or configurations. Examples of well known computing systems, environments, and/or configurations that may be suitable for use with the invention include, but are not limited to, regular telephones (without any screen) personal computers, server computers, hand-held or laptop devices, tablet computers, multiprocessor systems, microprocessor-based systems, set top boxes, programmable consumer electronics, network PCs, minicomputers, mainframe computers, distributed computing environments that include any of the above systems or devices, and the like.

Figure 5:
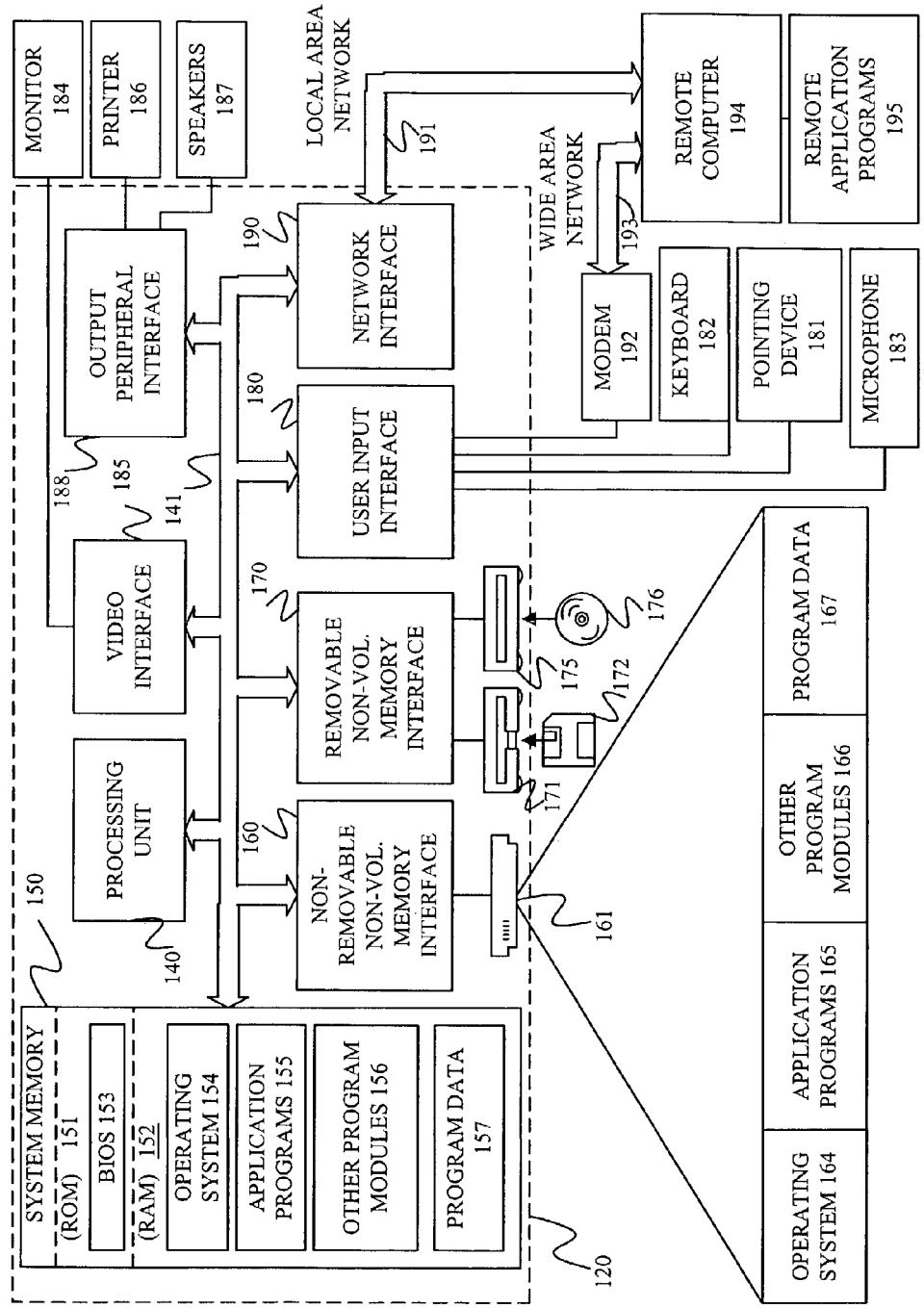
FIG. 5 is a block diagram of a general purpose computer.

The following is a brief description of a general purpose computer 120 illustrated in FIG. 5. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 5, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 5 illustrates operating system 154, application programs 155, other program modules 156, and program data 157.

The computer 120 may also include other removable/non-removable volatile/nonvolatile computer storage media. By way of example only, FIG. 5 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 5, provide storage of computer readable instructions, data structures, program modules and other data for the computer 120. In FIG. 5, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 5 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 5 illustrates remote application programs 195 as residing on remote computer 194. It will be appreciated that the network connections shown are exemplary and other means of establishing a communications link between the computers may be used.

Figure 6:
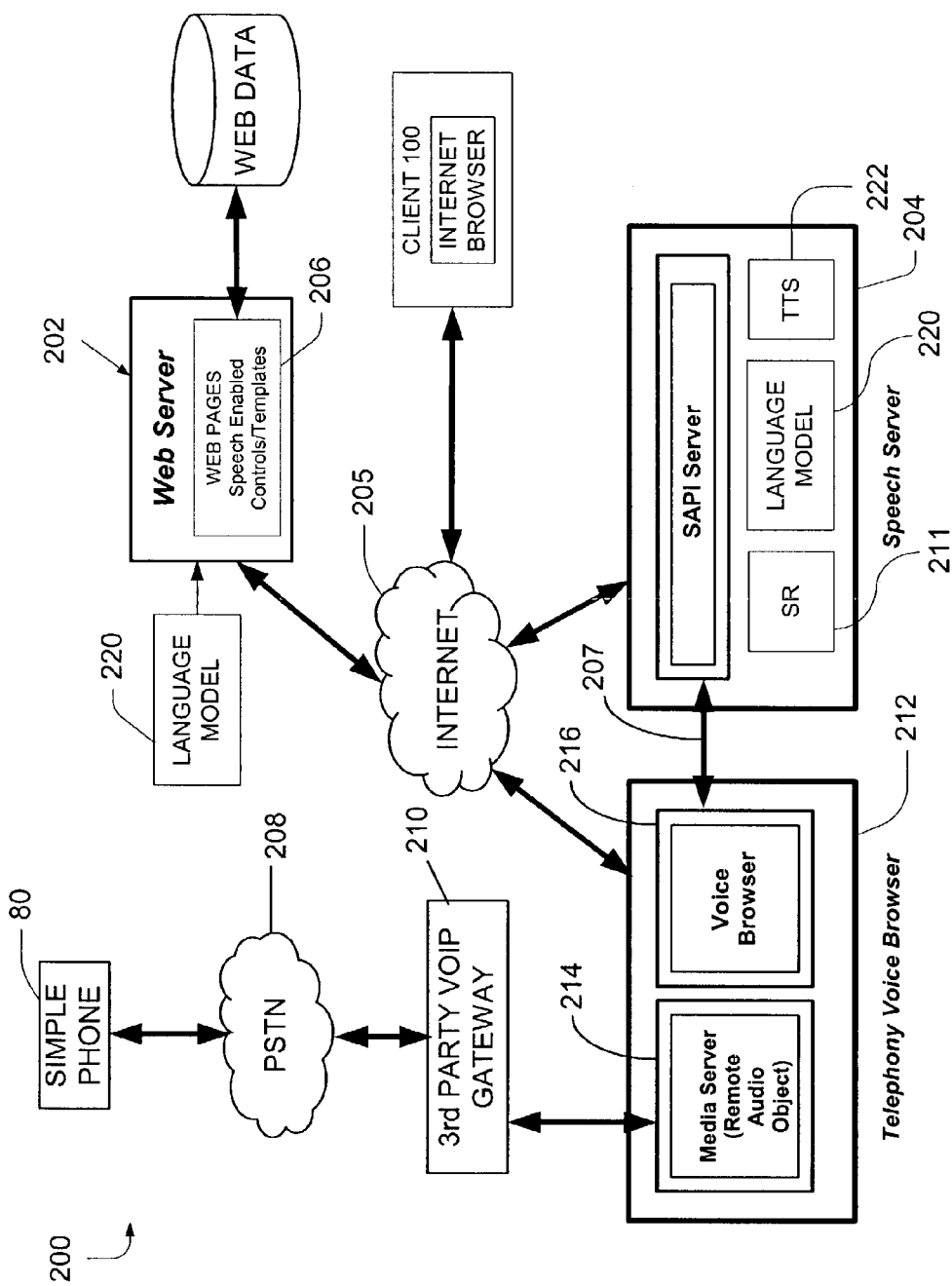
FIG. 6 is a block diagram of an architecture for a client/server system.

FIG. 6 illustrates architecture 200 for web based recognition and data rendering, which is one exemplary environment for the present invention. Generally, information stored in a web server 202 can be accessed through a client 100 such as mobile device 30 or computer 120 (which herein represent other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

In this embodiment, architecture 200 is unified in that whether information is obtained through client 100 or phone 80 using speech recognition, a single recognition server 204 can support either mode of operation. In addition, architecture 200 operates using an extension of well-known mark-up languages (e.g. HTML, XHTML, cHTML, XML, WML, and the like). Thus, information stored on web server 202 can also be accessed using well-known GUI methods found in these mark-up languages. By using an extension of well-known mark-up languages, authoring on the web server 202 is easier, and legacy applications currently existing can be also easily modified to include voice recognition.

Generally, client 100 executes HTML pages, scripts, or the like, generally indicated at 206, provided by web server 202 using a browser. When voice recognition is required, by way of example, speech data, which can be digitized audio signals or speech features wherein the audio signals have been preprocessed by client 100 as discussed above, are provided to recognition server 204 with an indication of a grammar or language model 220 to use during speech recognition., which may be provided by client 100. Alternatively, speech server 204 may include the language model 220. The implementation of the recognition server 204 can take many forms, one of which is illustrated, but generally includes a recognizer 211. The results of recognition are provided back to client 100 for local rendering if desired or appropriate. If desired, text-to-speech module 222 can be used to provide spoken text to client 100. Upon compilation of information through recognition and any graphical user interface if used, client 100 sends the information to web server 202 for further processing and receipt of further HTML pages/scripts, if necessary.

As illustrated in FIG. 6, client 100, web server 202 and recognition server 204 are commonly connected, and separately addressable, through a network 205, herein a wide area network such as the Internet. It therefore is not necessary that any of these devices be physically located adjacent each other. In particular, it is not necessary that web server 202 includes recognition server 204. In this manner, authoring at web server 202 can be focused on the application to which it is intended without the authors needing to know the intricacies of recognition server 204. Rather, recognition server 204 can be independently designed and connected to the network 205, and thereby, be updated and improved without further changes required at web server 202. Web server 202 can also include an authoring mechanism that can dynamically generate client-side markups and scripts. In a further embodiment, the web server 202, recognition server 204 and client 100 may be combined depending on the capabilities of the implementing machines. For instance, if the client 100 comprises a general purpose computer, e.g. a personal computer, the client may include the recognition server 204. Likewise, if desired, the web server 202 and recognition server 204 can be incorporated into a single machine.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephony voice browser 212 includes a media server 214 that provides a telephony interface and a voice browser 216. Like client 100, telephony voice browser 212 receives HTML pages/scripts or the like from web server 202. In one embodiment, the HTML pages/scripts are of the form similar to HTML pages/scripts provided to client 100. In this manner, web server 202 need not support client 100 and phone 80 separately, or even support standard GUI clients separately. Rather, a common mark-up language can be used. In addition, like client 100, voice recognition from audible signals transmitted by phone 80 are provided from voice browser 216 to recognition server 204, either through the network 205, or through a dedicated line 207, for example, using TCP/IP. Web server 202, recognition server 204 and telephone voice browser 212 can be embodied in any suitable computing environment such as the general purpose desktop computer illustrated in FIG. 5.

Figure 7:
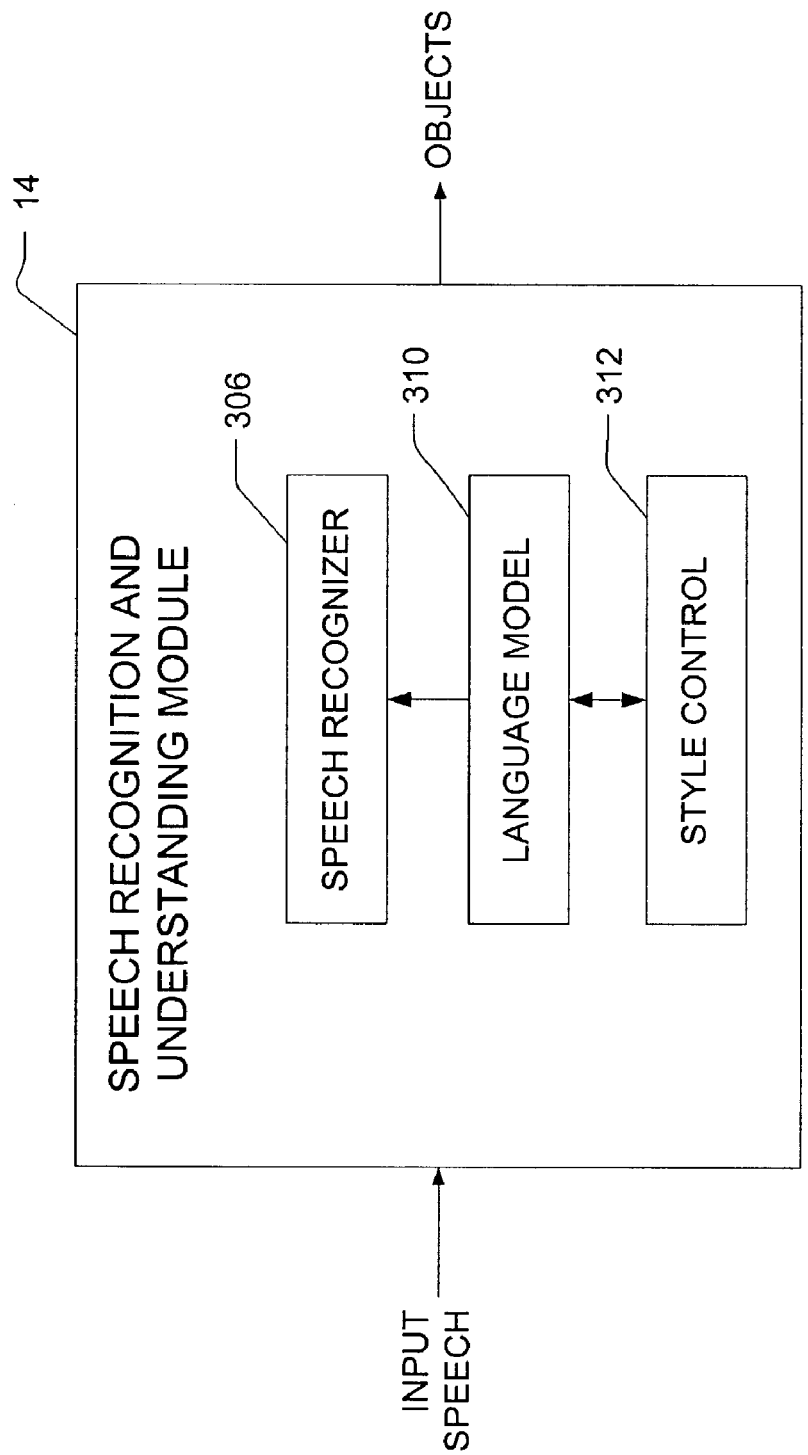
FIG. 7 is a block diagram of a speech recognition and understanding module.

Having described various environments and architectures functioning in system 10, a more detailed description of various components and the function of system 10 is provided. FIG. 7 illustrates a block diagram of speech recognition and understanding module 14. Input speech received from speech interface module 12 is sent to speech recognition and understanding module 14. Speech recognition and understanding module 14 includes a recognition engine 306, which has an associated language model 310. Recognition engine 306 uses language model 310 to identify possible surface semantic structures to represent the respective inputs. Recognition engine 306 provides at least one surface semantic output object based on the input speech. In some embodiments, the recognition engine 306 is capable of providing more than one alternative surface semantic object for each alternative structure.

Although illustrated in FIG. 7 wherein speech input is provided, the present invention can be used with handwriting recognition, gesture recognition or graphical user interfaces (where the user interacts with a keyboard or other input device). In these other embodiments, the speech recognizer 306 is replaced with a suitable recognition engine as is known in the art. For graphical user interfaces, a grammar (having the language model) is associated with the user input such as through an input box. Accordingly, a user's input is processed in a consistent way without significant modification based on the manner of input.

For language-based user input such as speech and handwriting, the language model 310 used by the recognition engine 306 can be any one of a collection of known stochastic models. For example, the language model can be an N-gram model that models the probability of a word in a language given a group of N preceding words in the input. The language model can also be a context free grammar that associates semantic and/or syntactic information with particular words and phrases. In a further embodiment of the present invention, a unified language model is used that combines an N-gram language model with a context free grammar. In this unified model, semantic and/or syntactic tokens are treated as place values for words and an N-gram probability is calculated for each hypothesized combination of words and tokens.

The language model 310 is capable of generating a hierarchical surface semantic structure based on information necessary for data rendering module 16 to render relevant information as a function of the objects provided thereto. In one embodiment, input speech is analyzed to identify various semantic tokens or objects within the input text. The objects are identified from a set of objects found in the language model 310. Generally, the objects represent information used by data rendering module 16 to render information. As described below, the objects may include query objects, navigation objects and/or command objects. Query objects contain information that pertain to information stored in database 18. Navigation objects contain information used to navigate through stored information while command objects can perform various commands based on stored information.

Speech recognition and understanding module 14 may also use a style control 312 to recognize alternative phrases for identifying objects in input speech. The style control 312 is associated with language model 310 to assist in providing relevant objects to data rendering module 16. In the environment illustrated in FIG. 6, information pertaining to the style control 312 can be implemented by an application author at web server 202 using authoring tools such as ASP.NET by Microsoft Corporation of Redmond, Wash. Alternatively, other authoring tools such as JSP, J2EE, J2SE or J2ME, or the like can also be used. For example, a phrase, "What is the distance until my next turn?" can be "styled" into a phrase like, "How far is it until my next turn?" Additionally, "What is the orientation for my next turn?" can be rephrased with, "Which way is my next turn?" or, "Towards which direction is my next turn?" Thus, the style control 312 can be used to identify relevant data within database 18 and also identify appropriate answers to provide a user.

In the event the user provides speech that the language model does not recognize, the system can prompt the user to repeat the input. However, if the system does not have information related to the input based on the semantic information in the input or lack thereof, the system can execute a suitable help routine instructing the user of available options.

Figure 8:
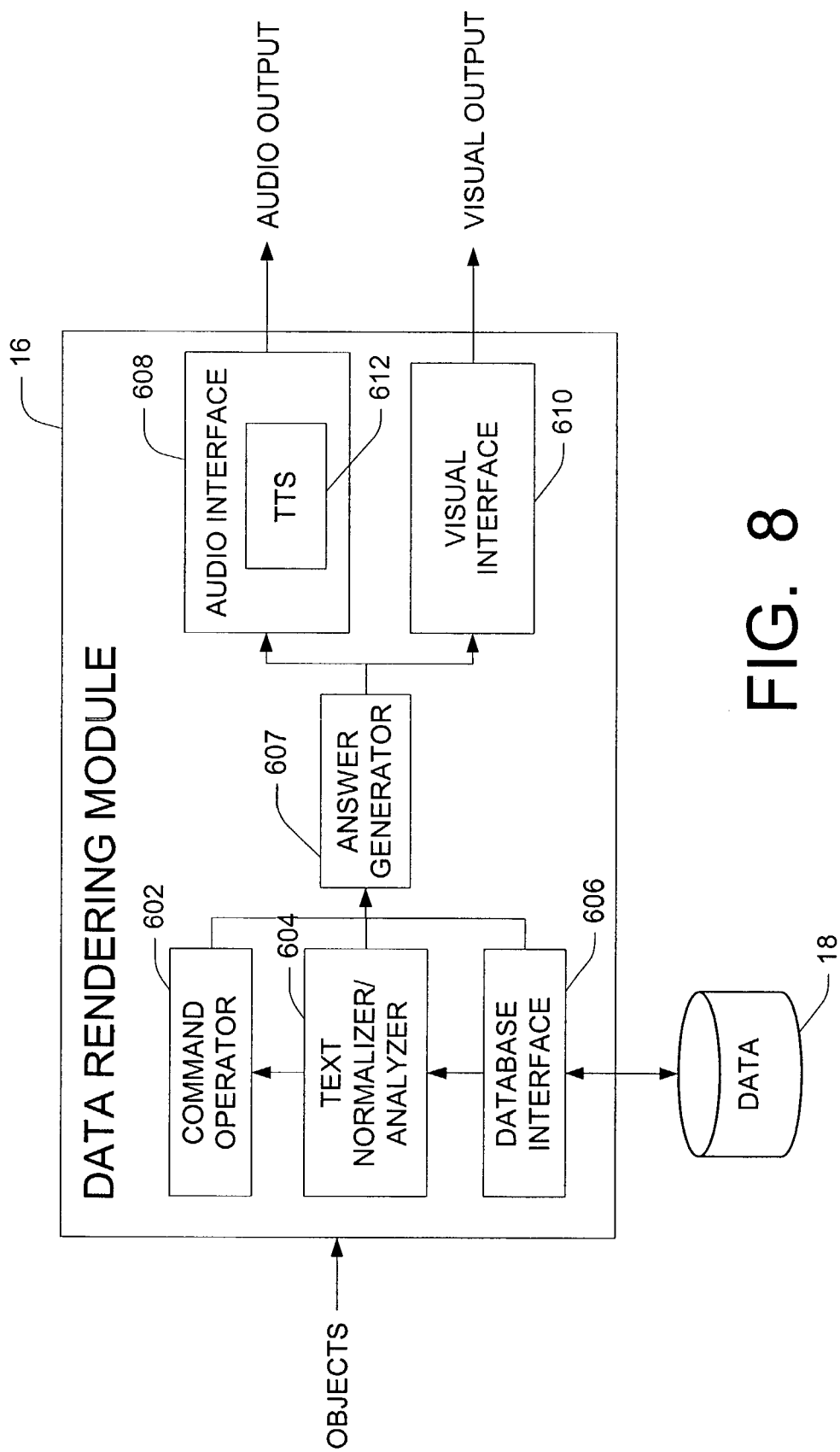
FIG. 8 is a block diagram of a data rendering module.

FIG. 8 illustrates a detailed block diagram of data rendering module 16. Data rendering module 16 includes a command operator module 602, a text analyzer/normalizer module 604, a database interface module 606, an answer generator module 607, an audio interface module 608, a visual interface module 610 and a text-to-speech module 612. Data rendering module 16 receives objects from speech recognition and understanding module 14 and provides an output (audio and/or visual) of relevant information to the user. As mentioned earlier, key words or phrases are identified by speech recognition and understanding module 14 and provides an object as a function thereof. Data rendering module 16 interprets the objects received from speech recognition and understanding module 14 in order to retrieve and/or extract data from database 18 using database interface 606. Database interface 606 includes information regarding the structure or schema of data stored in database 18. It is worth noting that database interface 606 may be a general purpose module that may access data from various different sources, for example from a local computer or a web server located across a wide area network. To extract relevant information, data rendering module 16 associates the objects received from speech recognition and understanding module 14 with tags or identifiers corresponding to stored information in database 18.

In some instances, data stored in database 18 already includes various tags or identifiers that correspond to the type of information or the structure of the information in database 18. In other instances, text analyzer/normalizer 604 may be used to generate tags or otherwise identify relevant information within the data. Additional processing of the data may be performed before relevant information is rendered to the user. For example, command operator 602 may be used to process various combinations of data obtained from database 18 based on the objects received.

Once relevant information has been processed according to the request by the user, data is sent to answer generator 607. Answer generator 607 may develop a suitable answer to the input provided by the user. Answer generator 607 then sends data to audio interface 608 and/or visual interface 610 to be rendered to the user. A text-to-speech module 612 within audio interface 608 can be used to audibly render the data.

Figure 9:
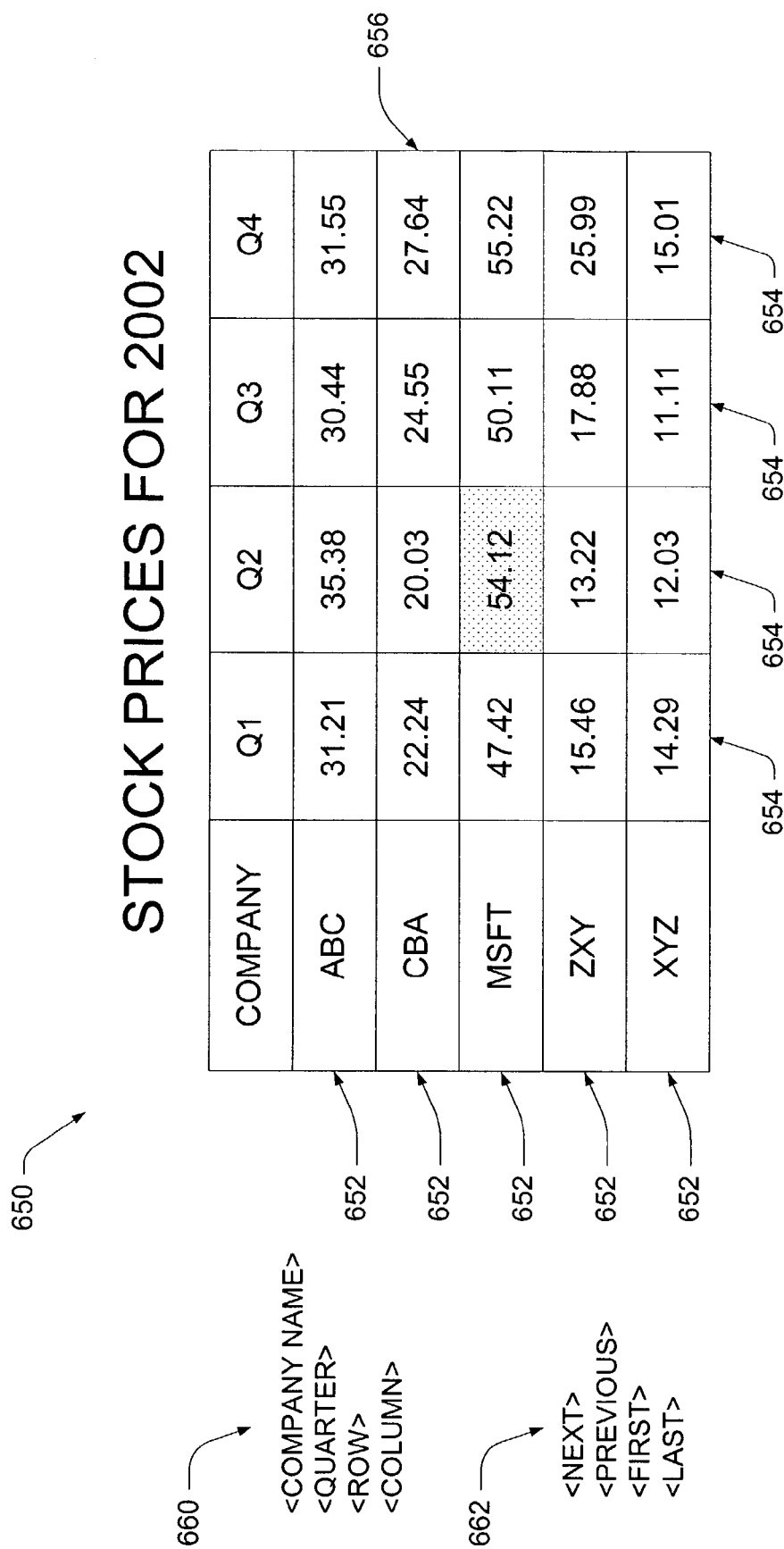
FIG. 9 is a diagram of a table of stock prices and objects for rendering data within the table.

FIG. 9 schematically illustrates a table 650 in database 18 which may be selectively rendered to a user through queries. Table 650 shows closing stock prices for various companies in the year 2002 at the end of the each quarter. Table 650 includes company names stored in rows 652, columns 654 for each quarter for the year 2002 and stock prices 656 for the columns and rows. Tags associated with table 650 correspond to the columns and rows. Query objects 660 and navigation objects 662 are defined by language model 310 to render data in table 650.

In order to selectively render data in table 650, a user provides a query that includes query objects 660 and/or navigation objects 662. The query is interpreted by the recognition and understanding module 14 to identify the relevant query and navigation objects. The objects are then associated with tags corresponding to the columns and rows.

Query objects 660 can be used to render information from a particular cell in table 650. For example, the voice query may be, "What was the closing stock price of Microsoft in the second quarter?" In this case, speech understanding module 14 would provide query objects "Microsoft" and "quarter 2" to data rendering module 16. Using these objects, data rendering module 16 associates these objects with tags of database 18 to determine the appropriate cell (shown as the shaded cell in table 650) that is to be rendered. In this case, "Microsoft" is a query object containing information pertaining to the object <company name> and "quarter 2" is a query object containing information pertaining to the object <quarter>.

"Microsoft" is associated with the tag corresponding to the row denoted "MSFT" and "quarter 2" is associated with the tag corresponding to the column denoted "Q2". After associating the objects with appropriate tags, the stock price "54.12" is provided to answer generator 607. An answer can be generated using the relevant information and rendered to the user using audio interface 608 and/or visual interface 610. For example, the answer rendered may be, "The closing stock price for Microsoft in the second quarter was fifty four dollars and twelve cents."

In this example, the answer generator 607 received the value "54.12" and uses that value in combination with stored context for rendering the retrieved data. In this example, the stored context is "The closing stock price for <company name> in the <quarter> was <result>", where <quarter> and <result> have also been normalized. The context used to render the data retrieved can be individually associated with the tags or identifiers for the data as necessary, and/or as a function of the objects. If visual outputs are provided, the answer generator 607 can provide indications on how to visually show the retrieved data.

Additionally, query objects 660 can include objects that will render an entire row or entire column. For example, a user may ask, "What are the closing stock prices for Microsoft in all the quarters of 2002?" In this instance, data rendering module 16 will render each of the values for Microsoft stock prices in 2002 to the user.

Navigation objects 662 may be used in order for a user to navigate through table 650 relative to a position in the table. For example, a user, after inquiring about the closing stock price for Microsoft in quarter 2, may ask "What is the closing stock price for Microsoft in the next quarter?" In this case, speech recognition and understanding module 14 will identify the objects "Microsoft" and "next quarter". These objects will be associated with the tag for the row "Microsoft" and the next column tag, for example the column "Q3". As a result, the data for the next quarter in the row Microsoft will be rendered.

Various speech application program interfaces may be used to implement the present invention. One such interface is for example SAPI, developed by Microsoft Corporation of Redmond, Wash. In addition, the present invention can be embodied using a markup language extension such as speech application language tags (SALT). SALT is a developing standard for enabling access to information, applications and web services from personal computers, telephones, tablet PCs and wireless mobile devices, for example. SALT extends existing markup languages such as HTML, XHTML and XML. The SALT 1.0 specification may be found online at www.SALTforum.org. It should be noted that SALT can provide semantic information based upon the user's input, for example from speech server 204, which such information forms the objects provided to data rendering module 16. As discussed further below, use of SALT extensions or similar extensions provides support for event driven user interaction to selectively render data.

FIGS. 10A-10C provide exemplary XML code using SALT for rendering the data in table 650 as described above. As illustrated in FIG. 10A, the code includes a header portion 670, a data portion 672 and an input portion 674. Header portion 670 includes various information for initializing and establishing elements of the web page or application. Data portion 672 represents the data of table 650 with various tags. For example, data portion 672 includes tag 676 for <company>, which indicates a row, tag 677 for <name> and tag 678 for <Q2>, where <name> and <Q1> <Q2>, etc. denotes columns. Although shown wherein data portion 672 includes the information to be rendered, data portion 672 may include links to other locations having the information, for example by using a Uniform Resource Locator (URL). Input portion 674 defines various inputs expected from a user.

FIG. 10B continues the code for rendering data in table 650. In FIG. 10B, various speech applications tags are denoted with the tag "SALT". For example, the tags include a "listen" tag 680, a "grammar" tag 682 and "prompt" tags 684 and 686. Listen tag 680 is used for speech input. The listen tag configures a speech recognizer, executes recognition and handles speech input events. Grammar tag 682 is used to specify grammars used in recognition. In this manner, the grammar 682 identifies a language model. In this example, rule portion 688 of the grammar has been defined for various company names in table 650 and rule portion 690 has been defined for each of the quarters in table 650. Prompt tags 684 and 686 are used to specify system output, i.e., the context as described above. The prompt tags may be simple text, speech output markup, variable values, links to audio files, or combinations thereof. Functions and/or scripting methods can also be used to format the retrieved data, as discussed below. Prompt 684 generates an answer based on the user's request and acts as answer generator 607 illustrated in FIG. 8. Prompt 686 asks the user to input a query.

FIG. 10C continues the code from FIG. 10B and includes a script 692 for rendering relevant information based on a user's voice query. The script 692 identifies the relevant cell to be rendered and calls prompt 684 for rendering based on the objects identified and association between the objects and tags corresponding to the data in data portion 672. This example also illustrates eventing support and embedded script hosting, wherein upon activation of the recognition and identification of objects, a function is called or executed in script portion 692 to selectively render data.

Data rendering module 16 is also particularly useful in creating a dialog between a computer and a user. A dialog is particularly useful in a scenario where the user wishes to retrieve portions of the information stored in a database upon request. One such scenario is the rendering of driving directions. FIG. 11 illustrates a table 700 that includes sample driving directions. Table 700 is arranged in a plurality of rows 702 and a plurality of columns 704. Each of the rows 702 represents a turn in the driving directions, while each of the columns 704 represent particular information about each turn. Additional information, indicated at 706, may also be associated with table 700. The additional information 706 is shown as total values for a trip, but may include other information or links to other information. In one embodiment, information related to nearby businesses such as banks and restaurants is provided. A plurality of query objects 708 and a plurality of navigation objects 710 are also associated with table 700.

When rendering driving directions to a user, data rendering module 16 may default to render the first row (turn) of information. Data rendering module 16 may be programmed to render all or a part of the first turn to the user. For example, given the information in the first row of directions, answer generator 607 can audibly render to the user, "Take a left on Concord Avenue for a distance of 0.5 miles." The user may then ask further information about the turn, such as, "What is the sign post I should look for?" Alternatively, the user may ask for a portion of the turn to be repeated. For example, the user may ask, "What direction do I turn?" In this case, the direction object is associated with a tag for the present direction, namely "left." Data rendering module 16 retrieves the relevant information from table 700 and renders a suitable answer, such as, "Take a left" Where "left" was obtained from the first row and the first column. When the user wishes to hear the next turn, the user can provide a query, such as, "What is the next turn?" Using navigation objects 710, data rendering module 16 can render relevant information for turns relative to a present position. For example, the user may ask, "What is the street name for the next turn?" The navigation object "next" will be associated with the tag for the next turn (i.e. row) given its current position in table 700 and the query object street name will be associated with the appropriate column and the relevant information will be rendered.

At any time, a user may access any portion of table 700 using an appropriate query, which provides corresponding objects. Additionally, a user may access the total distance and the approximate travel time 706 upon an appropriate query that is associated with the <total> object. Alternatively, a query may request a new set of driving directions based on a current location and input from the user. For example, the user may say, "Please take me to the closest Mexican restaurant." This input would be interpreted to generate a new set of driving directions based on the current location and data providing an address of the closest Mexican restaurant. Accordingly, the language model associated with the driving directions may be expanded to recognize various query, navigation or commands objects based on this information and if necessary execute code, for example, scripts that would acquire new data contained in remote databases that will be used to access the remote information. The system may also acquire a new language model to selectively render the new data. In one embodiment, the previous data that was being rendered (i.e. table 700) from, for example, a markup page or other code, can be saved with the current position noted so that upon completion of rendering the new information, the system can return back to rendering the previous information (i.e. table 700) from its current position.

Figure 12:
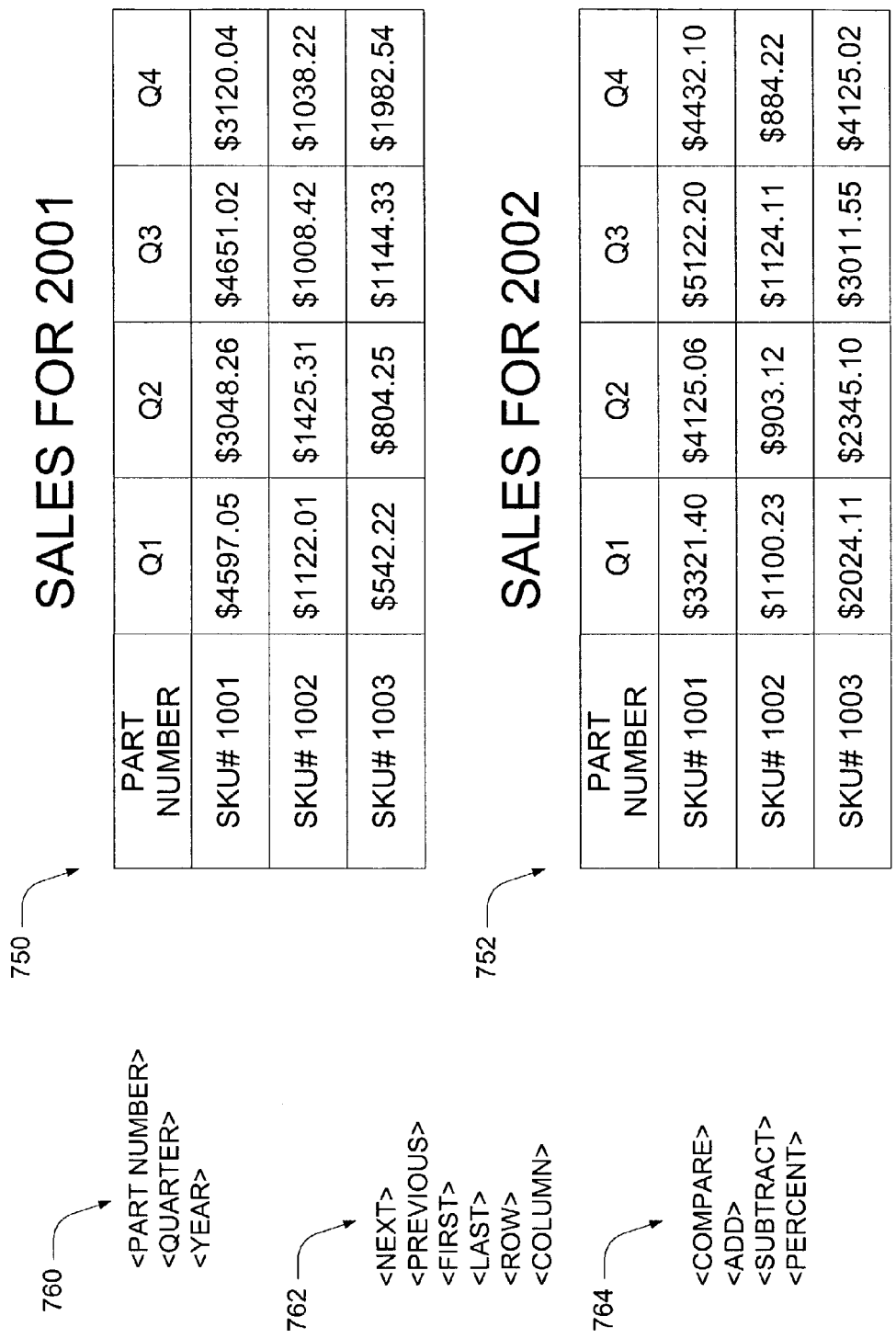
FIG. 12 is a diagram of a table of sales data and objects for rendering data within the table.

Data rendering module 16 can also be used to perform specific commands. FIG. 12 schematically illustrates data as tables 750 and 752, which include sales data for products in the years 2001 and 2002, respectively. In addition to querying individual cells and navigating through the table as described above, a user may request information using commands that process the data in tables 750 and 752 in order to render the described information. Query objects 760, navigation objects 762 and command objects 764 are all used when rendering data from table 750 and 752. Using command objects 764, a user can selectively render relevant information based on the information in tables 750 and 752 and execute a command based on that information.

For example, when using the <compare> object, a user may request, "Please give me the sales data for part 1001 in quarter one of 2001 and quarter one of 2002." Upon this query, data rendering module 16 will selectively render the values "$3048.26" and "$4125.06" with or without additional context. In one embodiment, the values can be displayed in a side-by-side relationship for easy comparison by the user as well as audibly rendered.

Command operator 602, using command objects 764, may also calculate data based upon a request from the user. For example, a user may ask, "Please add the sales for part 1001 in quarter one of year 2002 and quarter two of year 2002." This command uses the <add> object, which was also identified from the user's input. In this case, database interface 606 will extract the values of information for part 1001 in the relevant quarters of year 2002 and send the relevant data to command operator 602. Command operator 602 then adds each of the values together and sends the results to answer generator 607, which renders the data using audio interface 608 and/or visual interface 610. The command operator 602 may also add more than two values, for example an entire row of information. Other commands may also be used depending on the particular application. For example, <subtract> and <percent> may render values based on two or more data values.

Data rendering module 16 may also selectively render unstructured data, for example a paragraph of text, which in database 18 could have originated as an audible file, or handwriting input with suitable conversion. FIG. 13 illustrates a paragraph 800 of text relating to a stock market summary. Query objects 802 and navigation objects 804 are defined to selectively render paragraph 800 based upon voice input from a user. To selectively render paragraph 800, various tags must correspond to relevant information within paragraph 800. In one embodiment, text normalizer/analyzer 604 is used to identify relevant portions of paragraph 800 and generate various tags based on the relevant portions. For example, the normalizer/analyzer 604 may identify sentences (analogous to rows in the table explained above), numbers, company names, etc. Processing can include ascertaining semantic information for portions of the data.

Once paragraph 800 has been preprocessed to identify relevant tags, paragraph 800 may be rendered. Initially, data rendering module 16 begins to render the first sentence of text. Upon silence by the user or recognizing a "next" navigation object, data rendering module will begin to render the next sentence.

A user may also request to have certain portions of paragraph 800 rendered. For example, the user may request that the last stock index be repeated, using a query such as, "What was the last stock index?" When a <stock index> object is identified by speech recognition and understanding module 14, data rendering module 16 will associate this object with a tag in paragraph 800. For example, after the first sentence of paragraph 800 has been rendered, the data rendering module 16 will associate the stock index object with a tag corresponding to "Standard and Poor's five hundred Stock Index". Thus, after rendering a segment of information (i.e. a sentence) a portion of the segment may be rendered based on voice input from the user. It should be understood that any portion of the paragraph can be retrieved using a suitable query that provides corresponding objects to access the desired information. This technique of processing unstructured data and then allowing a user to provide queries, navigation and commands can be easily extended to render a complete newspaper, magazine or other sources of information. Such a technique can be supplemented with a defined hierarchical structure (e.g. sports section, business section, metro section, etc. of a newspaper) for rendering the information. Nevertheless, the technique includes ascertaining objects provided by the user and using those objects to selectively render information.

FIGS. 14A-14D illustrate exemplary XML code with SALT for rendering paragraph 800. Referring to FIG. 14A, a header portion 810 and data portion 812 are illustrated. Header portion 810 includes data to initialize the document. Data portion 812 illustrates paragraph 800 after the paragraph has been analyzed and normalized by text normalizer/analyzer 604. As illustrated, various tags such as <sentence>, <entity name="stock index"> and <entity name="number"> have been associated with portions of paragraph 800.

The code continues in FIG. 14B where various speech application language tags are illustrated. For example, the code includes a listen tag 814, a grammar tag 816 and prompt tags 818 and 820. Listen tag 814 initializes the speech recognizer and begins to identify objects within the user's voice input. Grammar tag 816 initializes the language model, which in this case defines navigation rules 820 and query rules 822.

FIG. 14C illustrates continuation of the code in FIG. 14B. A script tag 826 identifies the beginning of a script portion of the code. The script portion includes various functions for operating data rendering module 16. An execute command function 828 recognizes navigation or query commands and calls the necessary functions based upon the objects recognized. An initialize function 830 begins to play paragraph 800 from the beginning. A move back function 832 and move next function 834 are provided to move back one sentence and move next one sentence, respectively. In FIG. 14D, extract item function 836 extracts the relevant information from paragraph 800 based on a user's voice input. Display 836 displays paragraph 800 on a screen, for example.

As indicated above, data rendering module 16 may also be used for rendering other forms of unstructured text. For example, FIG. 15 illustrates a voicemail message 840. Objects 842 are used to render portions of the message. In order to render portions of the voicemail message 840, database interface 606 (FIG. 8) includes a speech recognizer to convert the voicemail message 840 to text. After the message has been converted to text, text normalizer/analyzer 604 is used to identify relevant portions of the voicemail message. For example, the text normalizer/analyzer 604 may identify a person, a subject of the message and/or numbers such as a phone number. Tags are generated based on this identification similar to that described above for paragraph 800. After the voicemail message or a portion of the voicemail message has been rendered, a user may request relevant portions to be repeated. For example, in the voicemail message of FIG. 15, a user may request that the phone number or the subject of the message be repeated. Using objects 842, data rendering module 16 associates the objects with tags corresponding to data in voicemail message 840. The data requested is then rendered.

In a further embodiment, a plurality of voicemail messages can be processed to provide selective access to each message using navigation objects. Command objects could be used to indicate return calls, etc. using information in the message (i.e. phone numbers) or by accessing other information such as a list of persons having telephone numbers. As another example, with regard to the driving directions example in FIG. 11, information pertaining to nearby businesses can also be accessed from remote information stores and/or remote applications.

Although the present invention has been described with reference to particular embodiments, workers skilled in the art will recognize that changes may be made in form and detail without departing from the spirit and scope of the invention.

What is claimed is:

1. A method of rendering information in a document to a user based on a query, comprising:
    rendering data in a document to a user;
    identifying a first object and a second object from the query;
    accessing the document to identify semantic tags associated with text in the document;
    associating the first object with a first semantic tag corresponding to a first portion of stored text within the document and the second object with a second semantic tags corresponding to a second portion of stored text in the document, wherein at least one of the first portion and second portion of stored text is associated with the data in the document that was rendered;
    identifying a third portion of stored text that is associated with both the first portion and the second portion; and
    selectively audibly rendering the third portion of stored text.

2. The method of claim 1 and further comprising:
    receiving a second query; and
    identifying a navigation object from the second query containing information to navigate within the stored text.

3. The method of claim 1 wherein the query further includes a command object containing information for performing a selected command on the stored text.

4. The method of claim 1 wherein identifying includes using a language model to identify the first object and the second object.

5. The method of claim 4 wherein identifying further includes using a style control to recognize alternative phrases for the first object and the second object.

6. The method of claim 1 wherein the stored text is arranged in a multi-dimensional structure and wherein at least one of the first object and the second object correspond to at least one dimension in the multi-dimensional structure.

7. The method of claim 6 wherein the multi-dimensional structure is a table including a plurality of rows and a plurality of columns and wherein the first object includes information pertaining to a particular row and the second object includes information pertaining to a particular column.

8. The method of claim 1 wherein selectively rendering the portion of stored text is based on at least one of the first object and the second object.

9. The method of claim 8 wherein selectively rendering the portion of stored text includes rendering the portion of stored text in combination with a stored context based on the first object and the second object.

10. The method of claim 1 wherein the query is an utterance of speech.

11. The method of claim 1 wherein the query includes handwriting input.

12. The method of claim 1 wherein selectively rendering the portion of stored text includes executing a script to render the portion.

13. A method of rendering information to a user based on a voice query, comprising:
    accessing stored text comprising a paragraph with a plurality of sentences that are arranged in a plurality of rows;
    audibly rendering a segment of the stored text to a user, wherein the segment comprises at least a portion of a selected row of the plurality of rows and wherein the selected row is analyzed to identify a plurality of semantic tags corresponding to columns within the selected row;
    receiving a voice query from the user and identifying at least one semantic object from the voice query while the segment of the stored text is being audibly rendered;
    associating the at least one semantic object with at least one of the semantic tags identified from the selected row, the at least one semantic tag corresponding to a portion of the selected row including one or more of the columns that has been audibly rendered; and
    audibly rendering the portion of the selected row corresponding to the at least one semantic tag.

14. The method of claim 13 and further comprising analyzing the segment to identify semantic tags of relevant information within the segment.

15. The method of claim 14 wherein the segment of text is speech data.

16. The method of claim 13 wherein the segment of text is a sentence and the tags correspond to data within the sentence.

17. The method of claim 13 wherein at least one tag corresponds to a proper name.

18. The method of claim 13 wherein at least one tag corresponds to a number.

19. The method of claim 18 wherein the at least one tag corresponds to a phone number.

20. The method of claim 13 wherein at least one tag corresponds to a portion of driving directions.

21. The method of claim 13 wherein audibly rendering the portion of the segment includes rendering the portion of the segment in combination with a stored context based on a first object and a second object from the query.

22. The method of claim 13 wherein the query includes handwriting input.

23. The method of claim 13 wherein selectively rendering the portion includes executing a script.

24. A method for providing information to a user, comprising:
    identifying a first object, a second object and a command object from a user voice query;
    accessing stored information and associating the first object and the second object with tags corresponding to a first portion of stored information and a second portion of stored information; and generating a data output as a function of values related to the first and second portions of stored information based on a data operation associated with the command object identified from the user voice query, the data output not being directly found in the stored information; and audibly rendering the generated data output.

25. The method of claim 24, wherein the operation comprises adding the first portion and the second portion.

26. The method of claim 24, wherein the operation comprises subtracting the first portion from the second portion.

27. The method of claim 24, wherein the operation comprises calculating a percentage based on the first portion and the second portion.

28. The method of claim 24, wherein associating comprises:

accessing a database comprising a plurality of stored information including the first and second portions of stored information, wherein the plurality of stored information includes values stored in a relational table in the database, the tags corresponding to columns and rows of the table.

29. The method of claim 28, wherein the first and second portions of stored information comprise first and second numerical values stored in the table, and wherein the data operation comprises a mathematical operation performed with the first and second numerical values to form a resultant numerical value.

30. The method of claim 29, wherein audibly rendering the generated data output comprises audibly rendering the resultant numerical value.

31. The method of claim 28, and further comprising:

identifying a navigation object from the user voice query; and identifying a tag corresponding to information stored in the table based on the navigation object and, in response, audibly rendering the information stored in the table.

* * * * *